US009325254B2

(12) United States Patent
Deng et al.

(10) Patent No.: US 9,325,254 B2
(45) Date of Patent: Apr. 26, 2016

(54) SCR DIMMING CIRCUIT AND DIMMING CONTROL METHOD

(71) Applicant: Silergy Semiconductor Technology (Hangzhou) Ltd., Hangzhou, Zhejiang (CN)

(72) Inventors: Jian Deng, Zhejiang (CN); Yunlong Han, Zhejiang (CN); Xiaodong Huang, Zhejiang (CN)

(73) Assignee: SILERGY SEMICONDUCTOR TECHNOLOGY (HANGZHOU) LTD., Hangzhou, Zhejiang (CN)

( * ) Notice: Subject to any disclaimer, the term of this patent is extended or adjusted under 35 U.S.C. 154(b) by 0 days.

(21) Appl. No.: 14/546,898

(22) Filed: Nov. 18, 2014

(65) Prior Publication Data

US 2015/0146461 A1 May 28, 2015

(30) Foreign Application Priority Data

Nov. 26, 2013 (CN) .......................... 2013 1 0611644

(51) Int. Cl.
| *H02M 7/155* | (2006.01) |
| *H05B 33/08* | (2006.01) |
| *H05B 37/02* | (2006.01) |
| *H02M 3/156* | (2006.01) |
| *H02M 1/00* | (2006.01) |

(52) U.S. Cl.
CPC ......... *H02M 7/1557* (2013.01); *H05B 33/0815* (2013.01); *H02M 3/156* (2013.01); *H02M 2001/007* (2013.01); *Y02B 20/42* (2013.01)

(58) Field of Classification Search
CPC .................. H02M 7/1557; H02M 2001/0038; H02M 2001/0087; H02M 2003/1555; H05B 33/0809; H05B 33/0815; H05B 33/0833; H05B 33/0839; H05B 33/0842; H05B 33/0845; H05B 33/0848; H05B 33/0851; H05B 39/044; H05B 39/047; Y02B 20/341; Y02B 20/346; Y02B 20/347
USPC ......... 363/78, 79, 80; 323/905; 315/307, 308, 315/DIG. 4; 307/31, 32, 33, 34, 35
See application file for complete search history.

(56) References Cited

U.S. PATENT DOCUMENTS

| 2011/0012530 | A1* | 1/2011 | Zheng | ................ | H05B 33/0815 315/294 |
| 2014/0062322 | A1* | 3/2014 | Yu | ...................... | H05B 33/0815 315/200 R |
| 2015/0264769 | A1* | 9/2015 | Jelaca | ................ | H05B 33/0815 315/206 |

(Continued)

FOREIGN PATENT DOCUMENTS

CN          103517531          1/2014

*Primary Examiner* — Adolf Berhane
*Assistant Examiner* — Jye-June Lee
(74) *Attorney, Agent, or Firm* — Beyer Law Group LLP

(57) ABSTRACT

A silicon-controlled rectifier (SCR) dimming circuit and a dimming control method are disclosed. The SCR dimming circuit includes a SCR element, a rectifier circuit, a filter circuit, a power converter, and a dimming control circuit. The dimmer control circuit includes a phase angle detection circuit, an output current feedback control circuit, an input current control circuit, a maximum operation time detection circuit, and a logic operator. An input current sampling signal fluctuates near a predetermined value after the SCR element is turned off by turning on and off the power converter, so that the input AC current is less than a holding current of the SCR element. The present SCR dimming circuit and the present dimming control method can avoid repeatedly turning on the SCR element in cycles of an operating frequency. Thus, the linearity of dimming is improved and the flicker of an LED lamp is eliminated.

12 Claims, 4 Drawing Sheets

(56) References Cited

U.S. PATENT DOCUMENTS

2015/0312988 A1* 10/2015 Liao .................. H05B 33/0815 315/119

2015/0366010 A1* 12/2015 Mao .................. H05B 33/0815 315/223

2015/0366018 A1* 12/2015 Kuang ............... H05B 33/0815 315/206

* cited by examiner

US 9,325,254 B2

SCR DIMMING CIRCUIT AND DIMMING CONTROL METHOD

CLAIM OF PRIORITY

This application claims priority to Chinese Application No. 201310611644.X, filed Nov. 26, 2013 (published as CN 103607825A), which is hereby incorporated by reference.

BACKGROUND OF THE INVENTION

1. Field of the Invention

The present disclosure generally relates to the field of power control of electronic devices, and more particularly, to a SCR dimming circuit and a dimming control method.

2. Description of the Related Art

In a conventional lighting control method, lamps are typically controlled to be turned on or off or change their luminance by using a SCR element. One SCR dimming circuit 10 according to the prior art is shown in FIG. 1. An AC input power supply 110 supplies energy to a load 160 through a SCR element 120, a rectifier circuit 130, a filter capacitor 140, and a power converter 150.

As shown in FIG. 2, curve (a) is a waveform diagram of a bus voltage outputted from the rectifier circuit 130, where the abscissa is time t in millisecond (ms) and the ordinate is voltage in volt (V); curve (b) is a waveform diagram of an AC input current $I_{AC}$, where the ordinate is current in ampere (A) and the abscissa is time t in millisecond (ms). The SCR element 120 includes a triode AC semiconductor switch (TRIAC). The TRIAC is turned off when an output power of the SCR dimming circuit 10 is relatively small and an AC input current $I_{AC}$ decreases to a value below a holding current of the TRIAC at time $t_1'$ during a half sine wave (a time period from $t_0'$ to $t_4'$ in FIG. 2);

the TRIAC is then turned on at time $t_2'$ after charging for a predetermined time so that the AC input current $I_{AC}$ is larger than the holding current of the TRIAC.

At time $t_3'$, the TRIAC is turned off again when the AC input current $I_{AC}$ decreases to a value below the holding current of the TRIAC.

At time $t_4'$, the TRIAC is turned on when the conduction condition of the TRIAC is satisfied. The next operation cycle may be repeated.

However, an input power of the AC power supply 110 is influenced by turning on the TRIAC at time $t_2'$ in the conventional method. Consequently, the bus voltage $V_{bus}$ of the power converter 150 fluctuates and causes flicker of an LED lamp as a load 160.

BRIEF DESCRIPTION OF THE INVENTION

One object of the present disclosure is to provide a SCR dimming circuit and a dimming control method which can avoid repeatedly turning on the SCR element in cycles of an operating frequency. Thus, the linearity of dimming is improved and the flicker of an LED lamp is eliminated.

According to one aspect of the present disclosure, there is provided a SCR dimming circuit comprising a SCR element, a rectifier circuit, a filter circuit, a power converter, and a dimming control circuit, wherein the SCR element, the rectifier circuit and the filter circuit are configured to obtain a bus voltage from an AC power supply for the power converter.

The dimming control circuit comprises (a) a phase angle detection circuit for receiving a bus voltage sampling signal indicative of the bus voltage, comparing the bus voltage sampling signal with a threshold voltage, and outputting a phase angle signal, (b) an output current feedback control circuit for receiving the phase angle signal and an output current feedback signal indicative of an output current of the power converter, and generating a first control signal in accordance with the phase angle signal and the output current feedback signal, (c) an input current control circuit for receiving an input current sampling signal indicative of an input current of the power converter, comparing the input current sampling signal with a predetermined value, and outputting a second control signal, wherein the predetermined value is less than a holding current of the SCR element, (d) a maximum operation time detection circuit for receiving the phase angle signal, measuring a first time period during which the phase angle signal is valid, and generating a third control signal which is valid when the first time period reaches a predetermined time and is invalid when the phase angle signal becomes invalid, and (e) a logic operator for receiving the first control signal, the second control signal and the third control signal, and outputting a driving signal.

Preferably, in the SCR dimming circuit, the phase angle detection circuit comprises a first comparator having a non-inverting input for receiving the bus voltage sampling signal and an inverting input for receiving the threshold voltage.

Preferably, in the SCR dimming circuit, the output current feedback control circuit comprises as low pass filter, an output current sampling circuit, a transconductance amplifier, a compensating circuit, and a second comparator. The low pass filter receives the phase angle signal, and converts the phase angle signal into an output current reference signal. The output current sampling circuit detects an output current of the power converter, and generates the output current feedback signal. The transconductance amplifier and the compensating circuit compare and compensate the output current reference signal and the output current feedback signal, and output a compensation signal. The second comparator has a non-inverting input for receiving the compensation signal, and an inverting input for receiving a first reference voltage, and outputs the first control signal.

Preferably, in the SCR dimming circuit, the input current control circuit comprises an input current sampling circuit and a third comparator. The input current sampling circuit detects and converts the input current sampling signal to a voltage signal, and the third comparator has a non-inverting input for receiving the voltage signal and an inverting input for receiving the predetermined value, and outputs the second control signal.

Preferably, in the SCR dimming circuit, the maximum operation time detection circuit comprises a timer for obtaining the maximum operation time, a first detection circuit for detecting a time period during which the phase angle signal is valid, and a RS flip-flop. The timer starts when the phase angle signal becomes valid, and outputs a SET signal when a measured time reaches as predetermined time. The first detection circuit resets the timer when the phase angle signal becomes invalid and outputs a RESET signal. The RS flip-flop generates the third control signal in accordance with the SET signal and the RESET signal.

Preferably, in the SCR dimming circuit, the logic operator outputs the driving signal which is valid and the power converter is turned on when the first control signal is valid and one or both of the second control signal and the third control signal are invalid.

According to another aspect of the present disclosure, there is provided a control method used in a SCR dimming circuit. The method comprises (a) receiving an AC power supply, (b) generating a bus voltage for a power converter from the AC power supply, after the AC power supply passes a SCR element and a rectifier circuit, and a filter circuit, (c) sampling the bus voltage, and an input current and an output current of the power converter to obtain a bus voltage sampling signal, an input current sampling signal and an output current feedback signal respectively, (d) determining whether a normal operation time of the power converter reaches a predetermined time in accordance with the bus voltage sampling signal, and (e) generating a driving signal in accordance with the bus voltage sampling signal and the output current feedback signal when the normal operation time of the power converter is less than the predetermined time. The driving signal is invalid when the normal operation time of the power converter reaches the predetermined time so that the power converter is turned off and the SCR element is turned off accordingly. The driving signal is also invalid when the normal operation time of the power converter is larger than the predetermined time and the input current sampling signal is larger than a predetermined value so that the power converter is turned off. The driving signal is valid when the normal operation time of the power converter is less than the predetermined time and the input current sampling signal is less than the predetermined value so that the power converter is turned on. The predetermined value is less than a holding current of the SCR element.

Preferably, the dimming control method further comprises generating a phase angle signal by comparing the voltage with a threshold voltage.

Preferably, the dimming control method further comprises converting the phase angle signal to an output current reference signal and generating a first control signal in accordance with the output current reference signal and the output current feedback signal.

Preferably, the dimming control method further comprises generating a second control signal by comparing the input current sampling signal with a predetermined signal.

Preferably, the dimming control method further comprises measuring a first time period during which the phase angle signal is valid and generating a third control signal which is valid when the first time period reaches the predetermined time. The third control signal is invalid when the phase angle signal becomes invalid.

Preferably, the dimming control method further comprises generating the driving signal in accordance with the first control signal, the second control signal and the third control signal. The driving signal is valid and the power converter is turned on when the first control signal is valid and one or both of the second control signal and the third control signal are invalid.

Embodiments of the present disclosure can advantageously provide several advantages over conventional approaches.

Particular embodiments of the SCR dimming circuit according to the present disclosure generates a bus voltage sampling signal, an input current sampling signal and an output current feedback signal by sampling the bus voltage, an input current and an output current of the power converter respectively. The SCR dimming circuit detects a normal operating time of the power converter in accordance with the bus voltage sampling signal, the input current sampling signal and the output current feedback signal, detects an AC input current signal, and outputs a driving signal to the power converter. Compared with the conventional approaches, the power converter is turned off by a driving signal which is invalid when the input current sampling signal is larger than the predetermined value, and is turned on by a driving signal which is valid when the input current sampling signal is less than the predetermined value, in a state that the SCR element is turned off. The input current sampling signal fluctuates near the predetermined value so that the AC input current is less than the holding current of the SCR element to avoid repeatedly turning on the SCR element in cycles of an operating frequency. Thus, the linearity of dimming is improved and flicker of an LED lamp is eliminated.

DETAILED DESCRIPTION OF EMBODIMENTS OF THE INVENTION

Some aspects of actual embodiments are omitted here for the sake of clarity and conciseness. In other instances, well-known functionality and structures have not been described in detail so as not to unnecessarily obscure aspects of the present disclosure. It should be understood that many details may be introduced in the implementation of actual embodiments so as to achieve some particular objects of those skilled in the art. For example, any actual embodiment herein may be modified to another embodiment in view of limitations of the relevant system or commercial requirements. These modifications may be sometimes complex and time-consuming, but are still conventional work of those skilled in the art.

Reference will now be made in detail to particular embodiments of the disclosure, examples of which are illustrated in the accompanying drawings. Other advantages and features of the present disclosure will become readily apparent from claims and the detailed description of preferred embodiments below. The accompanying drawings are illustrative and not intended to be limiting, but are examples of embodiments of the invention, are simplified for explanatory purposes, and are not drawn to scale.

Figure 1:
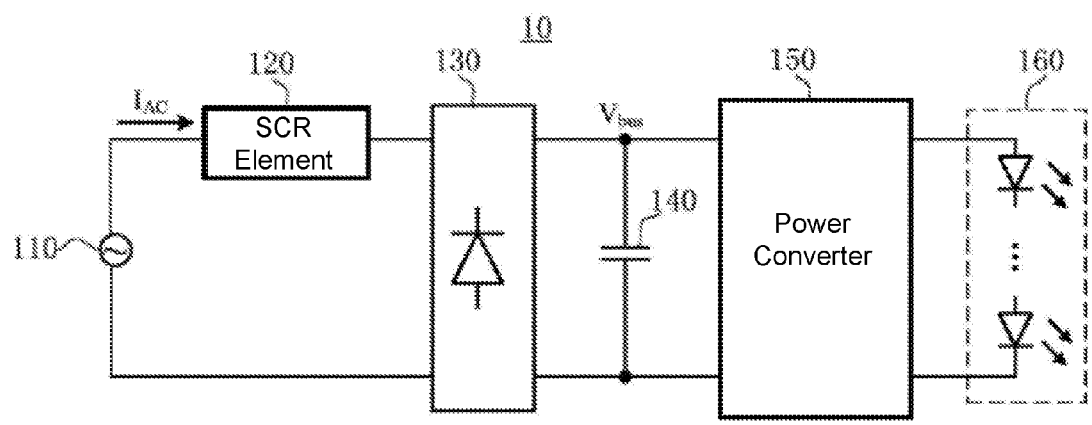
FIG. 1 is a schematic diagram of an example SCR dimming circuit according to the prior art.
Figure 2:
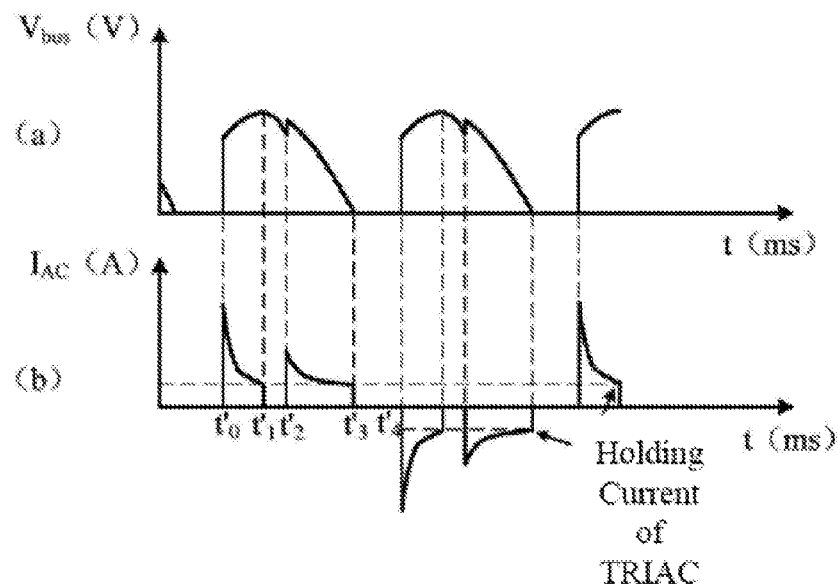
FIG. 2 is a waveform diagram showing example operation of the SCR dimming circuit according to the prior art.
Figure 3:
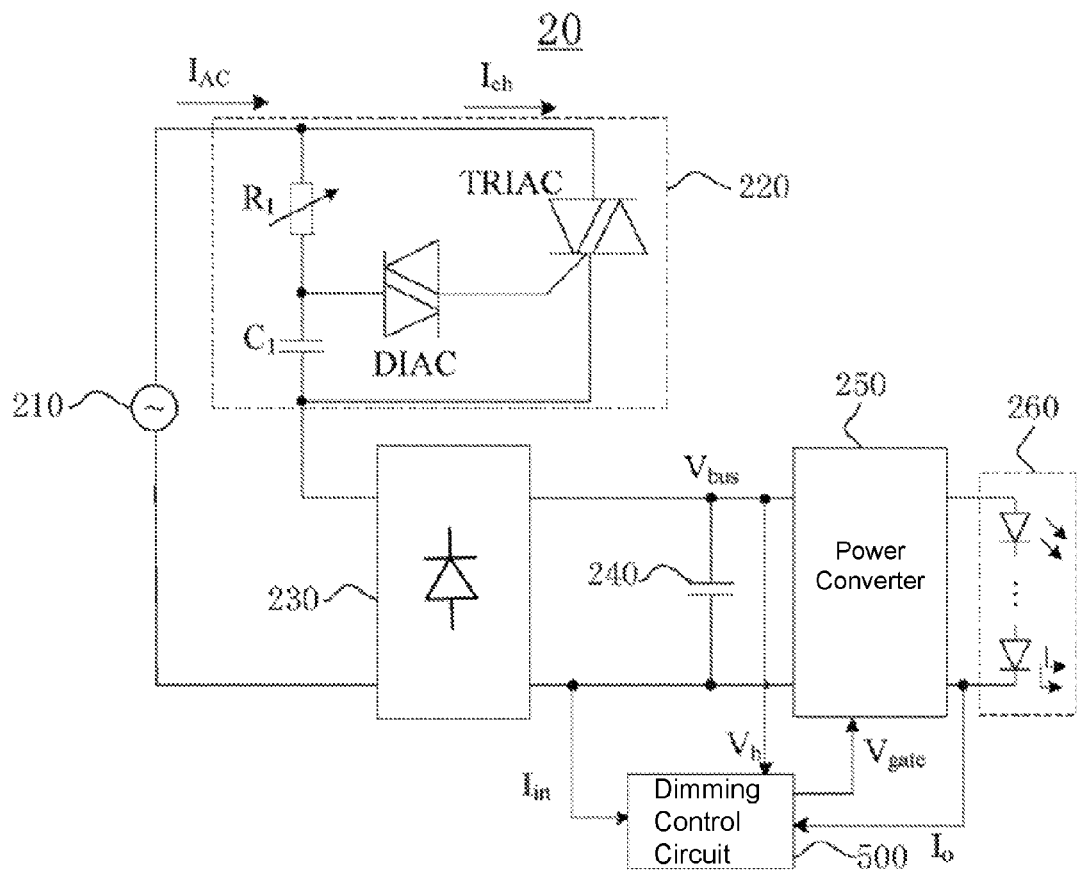
FIG. 3 is a schematic diagram of an example SCR dimming circuit according to an embodiment of the present disclosure.

Details of the present disclosure will be described below. FIG. 3 is a detailed diagram of an example SCR dimming circuit according to an embodiment of the present disclosure. As shown in FIG. 3, the SCR dimming circuit 20 includes a SCR element 220, a rectifier circuit 230, as filter circuit 240, a power converter 250 and a dimming control circuit 500. A bus voltage $V_{bus}$ is obtained from an AC input power supply 210 through the SCR element 220, the rectifier circuit 230, and the filter circuit 240, and then supplied to a load 260 after being regulated by the power converter 250.

Typically, the SCR element 220 includes a variable resistor $R_1$, a capacitor $C_1$, a bidirectional diode AC semiconductor switch (DIAC) and a triode AC semiconductor switch (TRIAC), as shown in FIG. 3.

The dimming control circuit 500 samples the bus voltage $V_{bus}$, and an input current and an output current of the power converter 250 to obtain a bus voltage sampling signal $V_b$, an input current sampling signal $I_{in}$ and an output current feedback signal $I_o$ respectively.

The dimming control circuit 500 determines whether a normal operation time of the power converter 250 reaches a predetermined time in accordance with the bus voltage sampling signal $V_b$.

The dimming control circuit 500 generates a driving signal $V_{gate}$ in accordance with the bus voltage sampling signal $V_b$ and the output current feedback signal $I_o$ when the normal operation time of the power converter 250 is less than the predetermined time;

The driving signal $V_{gate}$ is invalid when the normal operation time of the power converter 250 reaches the predetermined time so that the power converter 250 is turned off and the SCR element 220 is turned off accordingly.

The dimming control circuit 500 then determines whether the input current sampling current $I_{in}$ is larger than a predetermined value, wherein the predetermined value is less than a holding current of the SCR element.

The driving signal $V_{gate}$ is invalid when the input current sampling signal $I_{in}$ is larger than the predetermined value so that the power converter 250 is turned off.

The driving signal $V_{gate}$ is valid when the input current sampling signal $I_{in}$ is less than the predetermined value so that the power converter 250 is turned on.

The input current sampling signal $I_{in}$ fluctuates near the predetermined value so that the AC input current $I_{AC}$ is less than the holding current of the SCR element TRIAC to avoid repeatedly turning on the SCR element TRIAC in cycles of an operating frequency. Thus, the linearity of dimming is improved and flicker of the load 260 (for example, an LED lamp) is eliminated.

Figure 4:
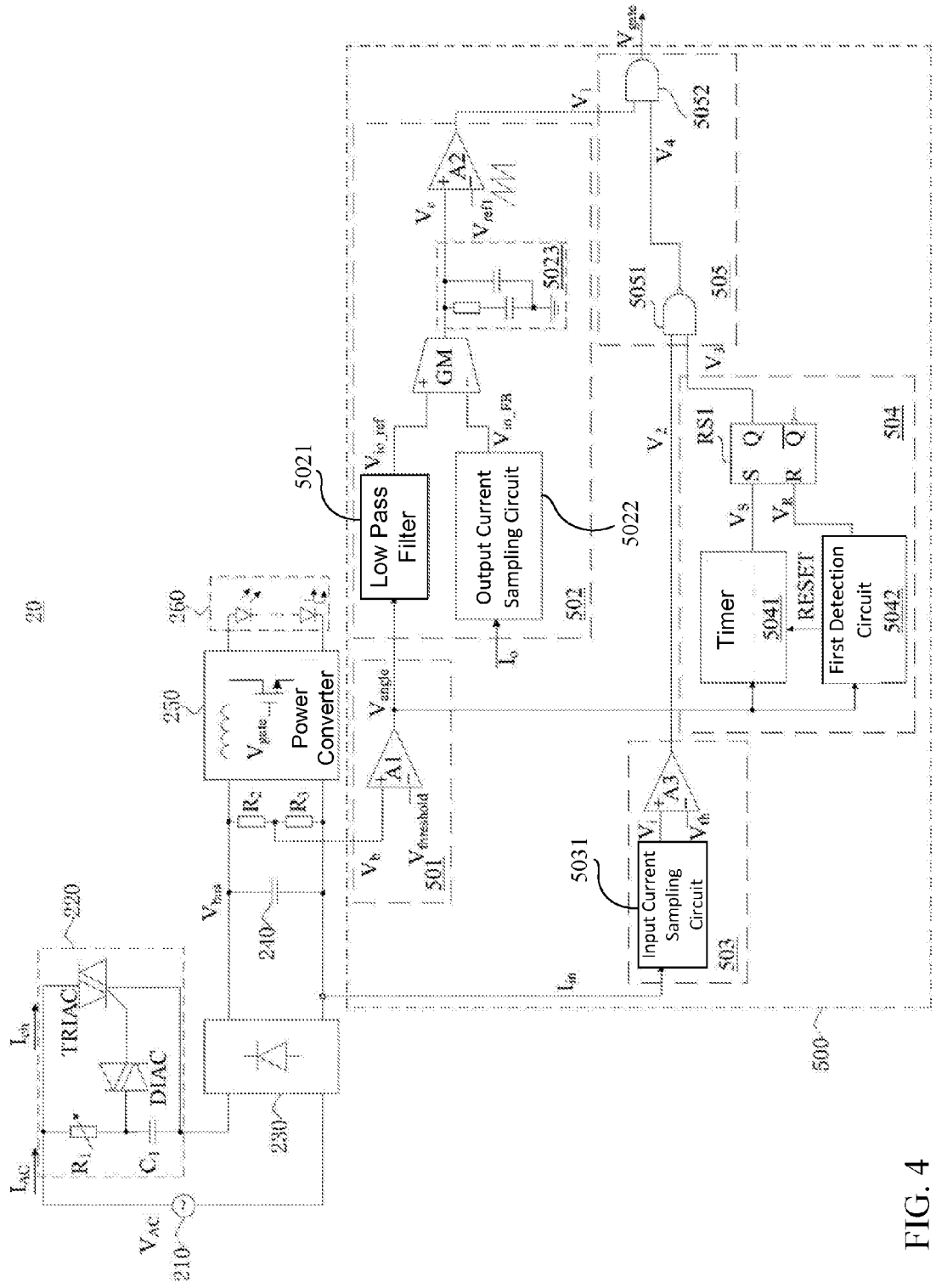
FIG. 4 is a detailed diagram of an example SCR dimming circuit according to an embodiment of the present disclosure.

FIG. 4 is as detailed diagram of an example SCR dimming circuit according to an embodiment of the present disclosure. Similar reference numerals are used in FIG. 4 for the same or similar elements in FIG. 3. As shown in FIG. 4, the dimming control circuit 500 includes a phase angle detection circuit 501, an output current feedback control circuit 502, an input current control circuit 503, a maximum operation time detection circuit 504, and a logic operator 505.

The phase angle detection circuit 501 receives a bus voltage sampling signal $V_b$ indicative of a bus voltage obtained by rectification and filtering, compares the bus voltage sampling signal $V_b$ with a threshold voltage $V_{threshold}$, and outputs a phase angle signal $V_{angle}$. The threshold voltage $V_{threshold}$ is slightly larger than zero, for example, 1V. However, the threshold voltage $V_{threshold}$ is not limited to 1V. The phase angle detection circuit 501 includes as first comparator A1 having a non-inverting input for receiving the bus voltage sampling signal $V_b$ and an inverting input for receiving the threshold voltage $V_{threshold}$. The phase angle signal $V_{angle}$ is valid when the bus voltage sampling signal $V_b$ is larger than the threshold voltage $V_{threshold}$, indicating that the SCR element 220 is turned on.

The output current feedback control circuit 502 receives the phase angle signal $V_{angle}$ and an output current feedback signal $V_{io\_FB}$ indicative of an output current of the power converter 250, and generates a first control signal $V_1$ in accordance with the phase angle signal and the output current feedback signal. Preferably, the output current feedback control circuit 502 may include a low pass filter 5021, an output current sampling circuit 5022, a transconductance amplifier GM, a compensating circuit 5023, and a second comparator A2.

The low pass filter 5021 receives the bus voltage sampling signal $V_b$, converts the bus voltage sampling signal $V_b$ to an output current reference signal $V_{io\_ref}$. The output current sampling circuit 5022 detects an output current of the power converter 250, and generates the output current feedback signal $V_{io\_FB}$. The transconductance amplifier GM compares and amplifies the output current reference signal $V_{io\_ref}$ and the output current feedback signal $V_{io\_FB}$, and outputs a compensation signal $V_c$ after being compensated by the compensation circuit 5023. As an example, the compensation circuit 5023 includes two compensation capacitors and a compensation resistor. Other equivalent circuits known by those skilled in the art may also be used in light of the teaching herein. The second comparator A2 has a non-inverting input for receiving the compensation signal $V_c$, and an inverting input for receiving a first reference voltage $V_{ref1}$, and outputs the first control signal $V_1$. Typically, the first reference voltage $V_{ref1}$ is a triangular wave or a sawtooth wave. The output current feedback signal $V_{io\_FB}$ also be obtained by sampling an inductor current of the power converter 250.

The input current control circuit 503 receives an input current sampling signal indicative of an input current of the power converter 250, converts it to a voltage signal $V_i$, compares the voltage signal $V_i$ with a predetermined value $V_{th}$, and outputs a second control signal $V_2$. Preferably, the input current control circuit 503 may include an input current sampling circuit 5031 and a third comparator A3, wherein the input current sampling circuit 5031 converts the input current sampling signal $I_{in}$ to the voltage signal $V_i$, and the third comparator A3 has a non-inverting input for receiving the input current sampling signal $I_{in}$ and an inverting input for receiving the predetermined value $V_{th}$, and outputs the second control signal $V_2$. The predetermined value $V_{th}$ is less than a holding current of the SCR element 220.

The maximum operation time detection circuit 504 receives the phase angle signal $V_{angle}$, measures a time period during which the phase angle signal $V_{angle}$ is valid, generates the third control signal $V_3$ which is valid when the time period reaches a predetermined time, and generates the third control signal $V_3$ which is invalid when the phase signal becomes invalid. Preferably, the maximum operation time detection circuit 504 may include a timer 5041 for obtaining the maximum operation time, a first detection circuit 5042 for detecting a time period during which the phase angle signal is valid, and a RS flip-flop RS1. The timer 5041 starts when the phase angle signal $V_{angle}$ becomes valid and the phase converter 250 starts its normal operation. The timer 5041 outputs a SET signal $V_S$ when a measured time reaches a predetermined time and the normal operation of the phase converter 250 continues for the predetermined time. The first detection circuit 5042 resets the timer 5041 and outputs a RESET signal $V_R$ when it detects that the phase angle signal $V_{angle}$ is invalid. The RS flip-flop RS1 generates the third control signal $V_3$ in accordance with the SET signal $V_S$ and the RESET signal $V_R$. As an example, the phase angle signal $V_{angle}$ is valid when it has a high level. The timer 5041 determines that the phase angle signal $V_{angle}$ is valid when detecting a leading edge of the phase angle signal $V_{angle}$. Similarly, the first detection circuit 5042 determines that the phase angle signal $V_{angle}$ is invalid when detecting a trailing edge of the phase angle signal $V_{angle}$.

The logic operator 505 receives the first control signal $V_1$, the second control signal $V_2$ and the third control signal $V_3$, and outputs a driving signal $V_{gate}$. Preferably, the logic operator 505 may include a NAND gate 505 and an AND gate 506. The NAND gate 505 receives the second control signal $V_2$ and the third control signal $V_3$, and outputs a fourth control signal $V_4$. The AND gate 506 receives the first control signal $V_1$ and the fourth control signal $V_4$, and outputs the driving signal $V_{gate}$. The driving $V_{gate}$ is valid and the power converter 250 is turned on when the first control signal $V_1$ is valid and one or both of the second control signal $V_2$ and the third control signal $V_3$ are invalid. The driving signal $V_{gate}$ is invalid in other cases.

Figure 5:
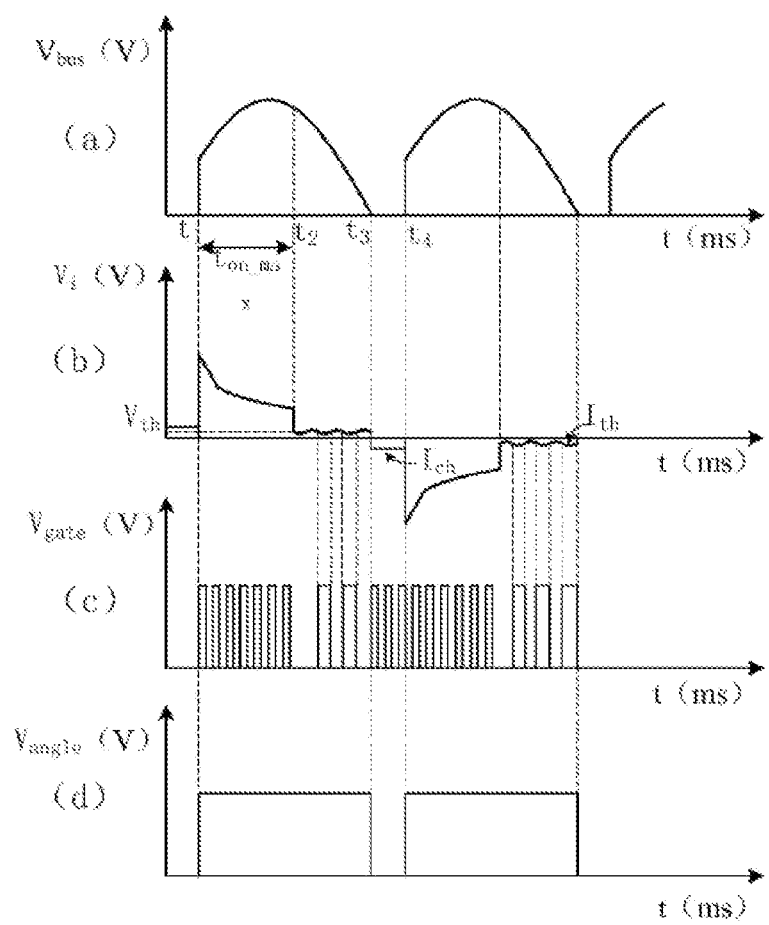
FIG. 5 is a waveform diagram showing example operation of the SCR dimming circuit according to an embodiment of the present disclosure.

Referring now to FIG. 5, a dimming control method according to an embodiment of the present disclosure will be described. As shown in FIG. 5, curve (a) is a waveform diagram of a bus voltage $V_{bus}$ outputted from the rectifier circuit 130, where the abscissa is time t in millisecond (ms) and the ordinate is voltage in volt (V); curve (b) is a waveform diagram of an AC input current $I_{AC}$, where the ordinate is current in ampere (A) and the abscissa is time t in millisecond (ms); curve (c) is a waveform diagram of a driving signal $V_{gate}$, where the ordinate is voltage in volt (V) and the abscissa is time t in millisecond (ms); and curve (d) is a waveform diagram of a phase angle signal $V_{angle}$, where the ordinate is voltage in volt (V) and the abscissa is time t in millisecond (ms).

When the AC input power supply 210 is connected, the AC input current $I_{AC}$ charges the capacitor $C_1$ through the variable resistor $R_1$. The voltage across the capacitor $C_1$ reaches a trigger voltage of the DIAC at time $t_1$, so that the DIAC is broken down and the TRIAC is turned on. The voltage across the TRIAC becomes zero immediately. Thus, the bus voltage $V_{bus}$ after rectification varies in accordance with the input voltage $V_{AC}$, as shown in FIG. 5. The power converter 250 operates normally. The first comparator A1 outputs the phase angle signal $V_{angle}$ which has a high level when the bus voltage sampling signal $V_b$ obtained by rectification, filtering, dividing and sampling of the bus voltage $V_{bus}$ is larger than the threshold voltage $V_{threshold}$. The timer 5401 in the dimming control circuit 500 detects the leading edge of the phase angle signal $V_{angle}$ and thus starts. The timer 5041 does not generate the SET signal $V_S$ in a time period during which the phase angle signal $V_{angle}$ is valid at a high level, until the predetermined time $t_{on\_max}$ has elapsed. In the time period, the power converter 250 operates normally. The RS flip-flop RS1 outputs the third control signal $V_3$ which is always invalid at a low level. Thus, the NAND gate 505 outputs the fourth control signal $V_4$ which is always valid at a high level. In such case, the output current feedback control signal 502 determines the generation of the driving signal $V_{gate}$. For example, the compensation signal $V_c$ increases when the output current feedback signal $V_{io\_FB}$ is less than the output current reference signal $V_{io\_ref}$. Thus, the time period, during which the first control signal $V_1$ outputted from the second comparator A2 is valid at a high level, increases. Also, the driving signal $V_{gate}$ has an increased duty ratio, and the output current feedback signal $V_{io\_FB}$ has an increased value. By such a close-loop control, the output current feedback signal $V_{io\_FB}$ will finally be equal to the output current reference signal $V_{io\_ref}$.

The first comparator A1 outputs the phase angle signal $V_{angle}$ which has a high level at time $t_2$, when the bus voltage sampling signal $V_b$ is still larger than the threshold voltage $V_{threshold}$. The timer 5041 generates the SET signal $V_S$, when the predetermined time $t_{on\_max}$ has elapsed in a time period during which the phase angle signal $V_{angle}$ is valid at a high level. In the time period, the power converter 250 operates normally. The RS flip-flop outputs the third control signal which is inverted to be valid at a high level. Meanwhile, the third comparator A3 outputs the second control signal $V_2$ which is valid at a high level because the voltage signal $V_i$, indicative of the input current sampling signal $I_{in}$, is larger than a predetermined value $V_{th}$. Thus, the NAND gate 505 outputs the fourth control signal $V_4$ which is invalid at a low level. The AND gate 506 outputs the driving signal $V_{gate}$ which is invalid at as low level so that the power converter 250 is turned off. Meanwhile, the current through the TRIAC decreases immediately to a value near zero. That is, the voltage signal $V_i$ decreases immediately to a value less than the predetermined value $V_{th}$. The TRIAC is turned off because the current through the TRIAC is less than as holding current of the TRIAC.

Figure 6:
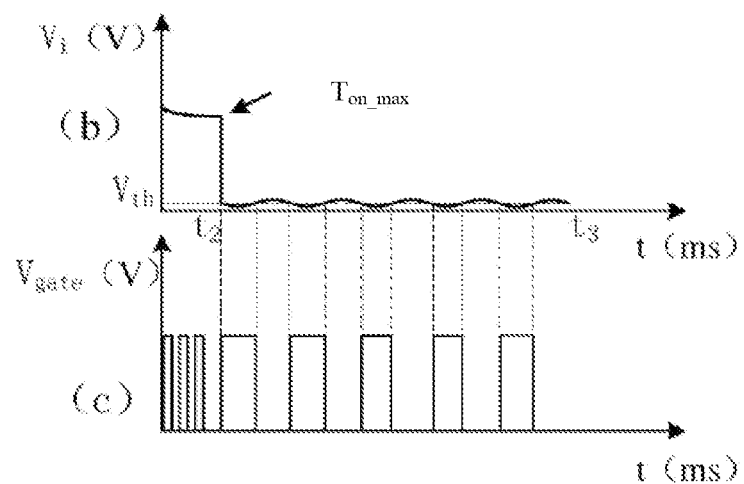
FIG. 6 is an enlarged view of the waveform diagram of FIG. 5 at a time period from t2 to t3.

The driving signal $V_{gate}$ controls an operation state of the power converter 250 in the time period from $t_2$ to $t_3$. FIG. 6 is an enlarged view of the waveform diagram of FIG. 5.

The third comparator A3 outputs the second control signal $V_2$ which has a low level when the voltage signal $V_i$ is less than the predetermined value $V_{th}$; Thus, the NAND gate 505 outputs the fourth control signal $V_4$ which has a high level, and the driving signal $V_{gate}$ has a high level.

The third comparator A3 outputs the second control signal $V_2$ which has a high level when the voltage signal $V_i$ is larger than the predetermined value $V_{th}$. Thus, the NAND gate 505 outputs the fourth control signal $V_4$ which has a low value, and the driving signal $V_{gate}$ has as low level.

By such as close-loop control, the voltage signal $V_i$ fluctuates near the predetermined value $V_{th}$ in the time period from $t_2$ to $t_3$, which ensures that the AC input current $I_{AC}$ is always less than the holding current of the TRIAC, avoids repeatedly turning on TRIAC and the flicker of an LED lamp is eliminated. Moreover, the bus voltage $V_{bus}$ is substantially consistent with the AC input voltage $V_{AC}$ because a voltage drop across the capacitor $C_1$ is small. Thus, an actual dimming angle can be detected correctly.

The power converter 250 restarts its normal operation at time $t_3$ when the bus voltage $V_{bus}$ decreases to zero. The first detection circuit 5042 detects a trailing edge of the phase angle signal $V_{angle}$, generates a RESET signal to reset the timer 5041, and outputs a RESET signal $V_R$ to the RS flip-flop RS1. The RS flip-flop RS1 outputs the third control signal $V_3$ which is inverted to be invalid at a low level. The NAND gate 505 outputs the fourth control signal $V_4$ which always has a high level, and the output current feedback control circuit 502 controls again the generation of the driving signal $V_{gate}$.

The TRIAC is turned on again at time $t_4$ and the operations from $t_1$ to $t_4$ are repeated.

The present disclosure can advantageously provide the following beneficial effects over the prior art:

Particular embodiments of the SCR dimming circuit according to the present disclosure generates a bus voltage sampling signal, an input current sampling signal and an output current feedback signal by sampling the bus voltage, an input current and an output current of the power converter respectively. The SCR dimming circuit detects a normal operating time of the power converter in accordance with the bus voltage sampling signal, the input current sampling signal and the output current feedback signal, detects an AC input current signal, and outputs a driving signal to the power converter. Compared with the conventional approaches, the power converter is turned off by a driving signal which is invalid when the input current sampling signal is larger than the predetermined value, and is turned on by a driving signal which is valid when the input current sampling signal is less than the predetermined value, in a state that the SCR element is turned off. The input current sampling signal fluctuates near the predetermined value so that the AC input current is less than the holding current of the SCR element to avoid repeatedly turning on the SCR element in cycles of an operating frequency. Thus, the linearity of dimming is improved and flicker of an LED lamp is eliminated.

Apparently, one skilled person may introduce various modifications and alternatives into the present invention, without departing from the spirit and scope of the disclosure.

The disclosure is intended to cover all of alternatives, modifications and equivalents that may be included within the spirit and scope of the disclosure as defined by the appended claims.

What is claimed is:

1. A SCR dimming circuit comprising a SCR element, a rectifier circuit, a filter circuit, a power converter, and a dimming control circuit, wherein said SCR element, said rectifier circuit and said filter circuit are configured to obtain a bus voltage from an AC power supply for said power converter, said dimming control circuit comprising:
   a phase angle detection circuit for receiving a bus voltage sampling signal indicative of said bus voltage, comparing said bus voltage sampling signal with a threshold voltage, an outputting a phase angle signal;
   an output current feedback control circuit for receiving said phase angle signal and an output current feedback signal indicative of an output current of said power converter, and generating a first control signal in accordance with said phase angle signal and said output current feedback signal;
   an input current control circuit for receiving an input current sampling signal indicative of an input current of said power converter, comparing said input current sampling signal with a predetermined value, and outputting a second control signal, wherein said predetermined value is less than a holding current of said SCR element;
   a maximum operation time detection circuit for receiving said phase angle signal, measuring a first time period during which said phase angle signal is valid, and generating a third control signal which is valid when said first time period reaches a predetermined time and is valid when said phase angle signal becomes invalid; and
   a logic operator for receiving said first control signal, said second control signal and said third control signal, and outputting a driving signal.

2. The SCR dimming circuit according to claim 1, wherein said phase angle detection circuit comprises a first comparator having a non-inverting input for receiving said bus voltage sampling signal and an inverting input for receiving said threshold voltage.

3. The SCR dimming circuit according to claim 1, wherein said output current feedback control circuit comprises a low pass filter, an output current sampling circuit, a transconductance amplifier, a compensating circuit, and a second comparator, wherein
   said low pass filter receives said phase angle signal, and converts said phase angle signal into an output current reference signal;
   said output current sampling circuit detects said output current of said power converter, and generates said output current feedback signal;
   said transconductance amplifier compares said output current reference signal and said output current feedback signal, and outputs a compensation signal after being compensated by said compensation circuit;
   said second comparator has a non-inverting input for receiving said compensation signal, and an inverting input for receiving a first reference voltage, and outputs said first control signal.

4. The SCR dimming circuit according to claim 1, wherein said input current control circuit comprises an input current sampling circuit and a third comparator, wherein said input current sampling circuit detects and converts said input current sampling signal into a voltage signal, said third comparator has a non-inverting input for receiving said voltage signal and an inverting input for receiving said predetermined value, and outputs said second control signal.

5. The SCR dimming circuit according to claim 1, wherein said maximum operation time detection circuit comprises a timer for obtaining said maximum operation time, a first detection circuit for detecting a time period during which said phase angle signal is valid, and a RS flip-flop, wherein,
   said timer starts when said phase angle signal becomes valid, and outputs a SET signal when a measured time reaches said predetermined time;
   said first detection circuit resets said timer when said phase angle signal becomes invalid and outputs a RESET signal; and
   said RS flip-flop generates said third control signal in accordance with said SET signal and said RESET signal.

6. The SCR dimming circuit according to claim 1, wherein said logic operator outputs said driving signal which is valid and said power converter is turned on when said first control signal is valid and one or both of said second control signal and said third control signal are invalid.

7. A dimming control method used in a SCR dimming circuit, comprising:
   receiving an AC power supply;
   generating a bus voltage for a power converter from said AC power supply, after said AC power supply passes a SCR element and a rectifier circuit, and a filter circuit;
   sampling said bus voltage, and an input current and an output current of said power converter to obtain a bus voltage sampling signal, an input current sampling signal and an output current feedback signal respectively;
   determining whether is normal operation time of said power converter reaches a predetermined time in accordance with said bus voltage sampling signal; and
   generating a driving signal in accordance with said bus voltage sampling signal and said output current feedback signal when said normal operation time of said power converter is less than said predetermined time,
   wherein said driving signal is invalid when said normal operation time of said power converter reaches said predetermined time so that said power converter is turned off and said SCR element is turned off accordingly;
   said driving signal is invalid when said normal operation time of said power converter is larger than said predetermined time and said input current sampling signal is larger than a predetermined value so that said power converter is turned off;
   said driving signal is valid when said normal operation time of said power converter is less than said predetermined time and said input current sampling signal is less than said predetermined value so that said power converter is turned on; and
   said predetermined value is less than a holding current of said SCR element.

8. The method according to claim 7, further comprising; generating a phase angle signal by comparing said bus voltage sampling signal with a threshold voltage.

9. The method according to claim 8, further comprising:
   converting said phase angle signal to an output current reference signal and generating a first control signal in accordance with said output current reference signal and said output current feedback signal.

10. The method according to claim 9, further comprising:
    generating a second control signal by comparing said input current sampling signal with a predetermined signal.

11. The method according to claim 10, further comprising:
measuring a first time period during which said phase angle signal is valid and generating a third control signal which is valid when said first time period reaches said predetermined time;
said third control signal is invalid when said phase angle signal becomes invalid.

12. The method according to claim 11, further comprising:
generating said driving signal in accordance with said first control signal, said second control signal and said third control signal,
wherein said driving signal is valid and said power converter is turned on when said first control signal is valid and one or both of said second control signal and said third control signal are invalid.

* * * * *